INVENTORS
GERARD CHEVREUX
ANDRE FURIA
BY
John A. Young
ATTORNEY

INVENTORS
GERARD CHEVREUX
ANDRE FURIA
BY
John A. Young
ATTORNEY

INVENTORS
GERARD CHEVREUX
ANDRÉ FURIA
BY John A. Young
ATTORNEY 3,088,283
HYDRAULIC SYSTEMS
Andre Furia, Neuilly, and Gerard Chevreux, Colombes, France, assignors to Societe Anonyme D.B.A., Paris, France, a company of France
Filed June 22, 1959, Ser. No. 821,944
7 Claims. (Cl. 60—52)

The invention relates to hydraulic systems and more particularly to hydraulic lift systems for connecting "mounted" implements to agricultural tractors, though this use is not limitative.

An object of the invention is the provision of a new and improved power hydraulic system wherein hydraulic pressure is supplied by a pump only for the periods when the system is working.

It is another object of the invention to provide a hydraulic lift system having a single acting hydraulic motor wherein pressure admission is controlled by a control valve and pressure release is controlled by exhaust valve means located between the control valve and motor and actuated by lever means positively coupling the control valve to the exhaust valve and to a non-return valve for forcible opening of the latter.

It is an important object of the invention to provide a hydraulic lift system for use on agricultural tractors wherein a limited pressure less than that required to raise the implement may be caused to be discharged by the pump to the lift cylinder upon operation by the driver of a lever distinct from the lift control lever, whereby the downward load on the tractor rear axle is increased by a part of the implement's weight and prevents skid of the rear wheels.

It is a further object of the invention to provide a hydraulic system of the type indicated above wherein the limited pressure in the power cylinder is metered responsive to mechanical actuation of valve means normally piloted by the distributor valve for opening unrestricted communication between the pump and discharge reservoir for the periods when the distributor valve does not admit fluid pressure to the power cylinder.

Still another object of the invention is to provide a hydraulic lift system for agricultural tractors wherein a clear "feel" of the weight transfer onto the tractor rear axle is provided for the driver by pressure reaction.

A secondary object of the invention resides in providing a hydraulic system wherein the elements are mounted on a support plate adapted to take the reaction forces during operation of the hydraulic system while a separate casing of light steel sheet encloses the elements and constitutes a large volume oil sump.

An overall object of the invention is the provision of a hydraulic lift system which is simple in construction, reliable and precise in operation and low in cost.

Other objects and advantages of the invention will be apparent from the following description which refers to the annexed drawings forming a part of the specification and in which.

Figure 1:
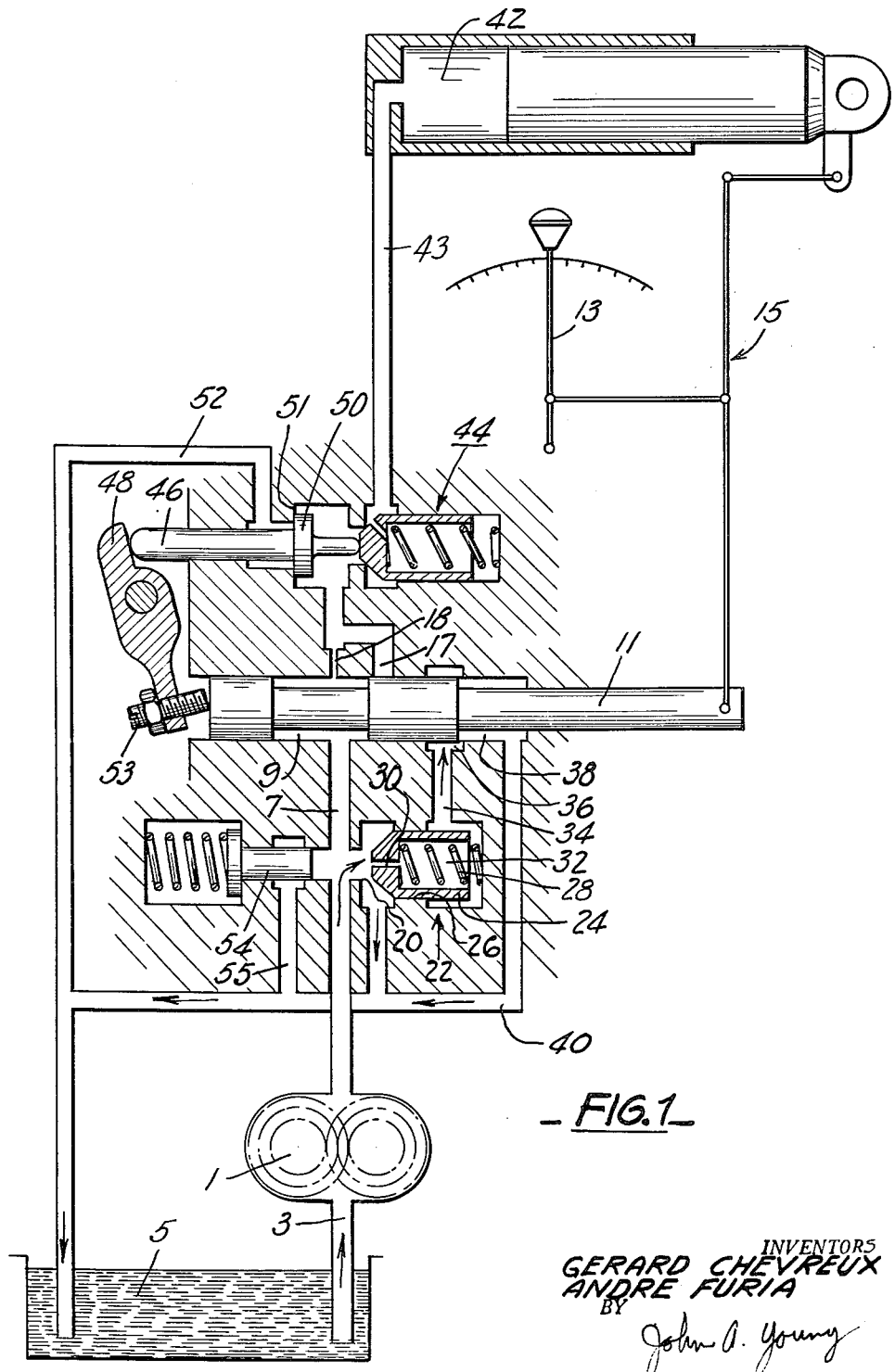
FIGURE 1 is a schematic view of a simple acting hydraulic lift system according to the invention, the control valve being shown in "neutral" position and the system in standby condition.

Referring to FIGURE 1 there is provided a single acting hydraulic lift system which comprises a continuously discharging pump 1. The pump is supplied with hydraulic fluid by an inlet line 3 connected to a reservoir 5 and delivers fluid to a pressure line 7 which opens in the bore of a distributor or control valve. The spool member 11 of the control valve is controlled by a manual lever 13 connected to the spool member through a conventional follow-up linkage 15. When the spool member is in neutral position (FIGURE 1) or displaced therefrom to the right a reduced diameter portion of the spool member, which delimits an annular chamber 9 in the valve bore, registers with the pressure line opening and the pump pressure then prevails in the annular chamber. The reduced portion of the spool member is located between a pair of lands slidably engaging the bore. On FIGURE 1, the left-hand land closes the bore while the right-hand land has an edge controlling communication between line 7 and a control valve outlet line 17 which leads to the left-hand end of cylinder. In neutral position (FIGURE 1) the land separates the lines and the only communication between line 17 and chamber 9 is provided by a restricted passage 18 drilled in the housing. As will be further apparent, the object of passage 18 is to eliminate the need for close tolerances in manufacture of the spool member.

The seat 20 of a piloted valve 22 opens in the pressure line 7. Construction and operation of the piloted valve are similar to those of the valve described in our copending application No. 822,087 filed on June 22, 1959, and will be only briefly described.

The piloted valve 22 comprises a valve member 24 slidable in a bore 26 and biased toward seat 20 by a light spring 28. Valve member 24 is formed with a restricted passage 30 which communicates the front face of the valve member with a rear chamber 32 communicated by a passage 34 with a counterbore 36 of the control valve bore. Restricted passage 30 may obviously be replaced by a slight predetermined clearance between the valve member and the bore. When the spool member is in "neutral" or in "lowering" position, an edge of the land of spool member 11 underlaps counterbore 36 and communicates it with a return chamber 38 connected with the reservoir by a line 40. When the spool member is moved to "raising" position (FIGURE 2), communication between counterbore 36 and chamber 38 is cut-off. Operation of the piloted valve will be described more completely hereunder; suffice it to say that it opens free communication between the pump and reservoir when the lift cylinder is not energized to raise the implement carried by the tractor.

Figure 2:
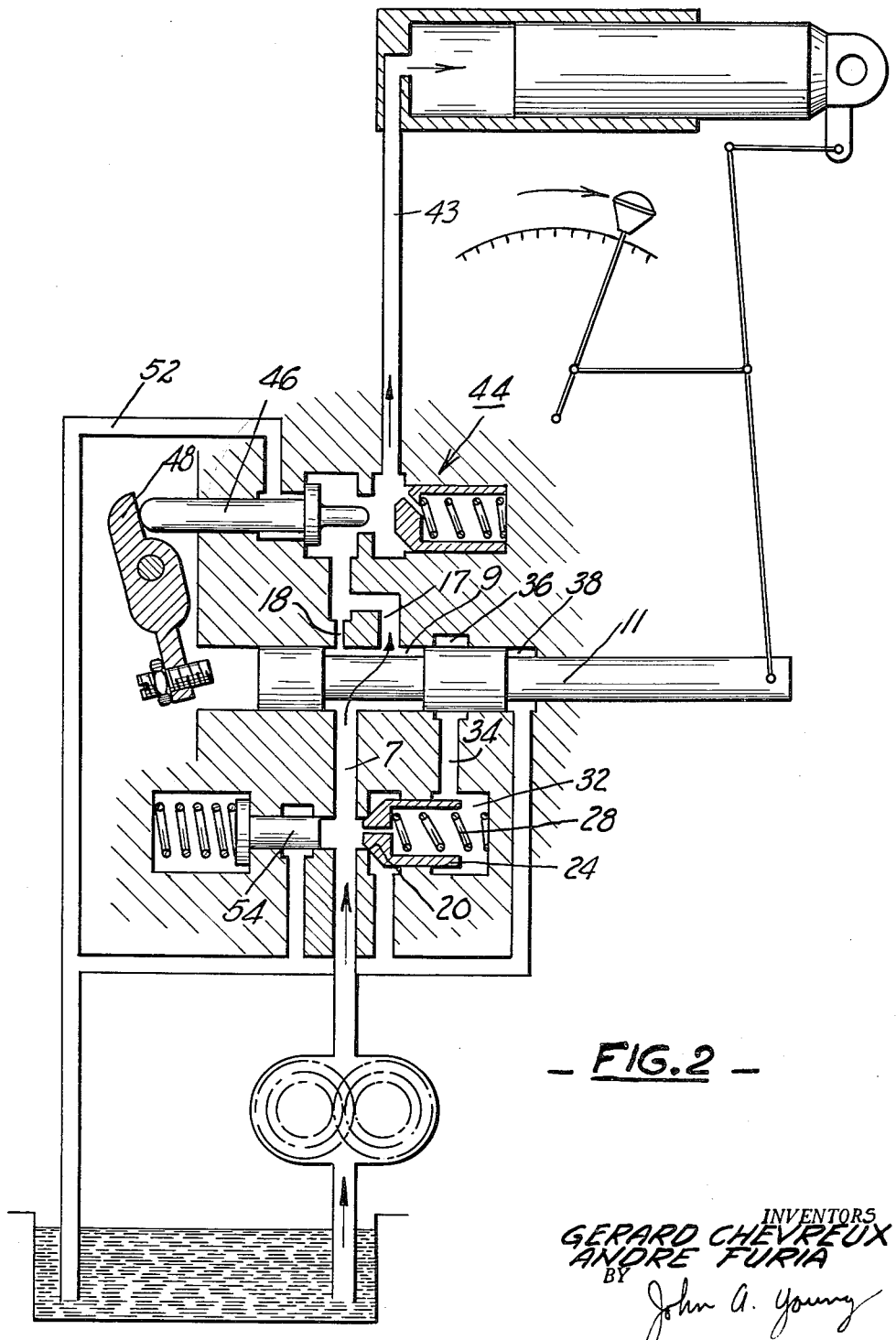
FIGURE 2 is a view similar to FIGURE 1, the control valve being shown in "raising" position and the system in "working" condition.

A non-return valve 44 may be located in work line 43 for maintaining the motor 42 under pressure when the control valve is brought back to neutral position by the follow-up linkage and the pump discharges into the reservoir. The non-return valve is automatically opened by the differential pressure acting thereon when the control valve is in "raising" position and delivers fluid pressure into the control valve outlet line 17 (FIGURE 2). When the control valve is put in "lowering" position (FIGURE 3), a push rod 46 actuated by a rocking lever 48 pivoted on the housing opens the non-return valve and connects cylinder 42 with control valve outlet line 17. The push rod 46 is formed with a flange 50 which is lifted clear of its seat 51 and permits the fluid in cylinder 42 to exhaust to the reservoir through a return passage 52. The implement then may sink under the action of its own weight.

Rocking lever 48 may conveniently be given a mechanical advantage comprised between 2 and 3 for amplifying the thrust received from spool member 11 and improving the precision in operation when the non-return valve is forcibly opened; an adjusting screw 53 is provided to compensate for manufacturing tolerances and to provide opening of valve 44 for a minimum displacement of the spool member from its neutral position. A relief valve 54 protects the hydraulic system against excessive pressure. The relief valve connects pressure line 7 to a discharge line 55 when the pressure in line 7 increases beyond the predetermined value for which valve 54 is set up to open.

Operation of the system is as follows: When the pump is at rest and the control valve for instance in neutral position, piloted valve 22 is maintained closed by its spring 28, chamber 9 of the control valve is communicated to control valve outlet line 17 only by restricted passage 18. As soon as pump 1 begins to operate there occurs a pressure drop along the hydraulic flow path comprising pump 1, pressure line 7, restricted passage 30, counterbore 36, return chamber 38, line 40 and reservoir 5. The main part of the pressure drop occurs across restricted passage 30. The corresponding differential pressure acting on valve member 24 lifts it off its seat and thereby opens unrestricted communication between pressure line 7 and line 40, as shown on FIGURE 1. The pressure in the annular chamber, located upstream of passage 18, is limited to the low value sufficient for the pressure force on member 24 to overcome the compression force of light spring 28.

The system is automatically switched into working condition as soon as the control valve comes into "lifting" position (FIGURE 2). Annular chamber 9, formed by the reduced portion of spool member 11, comes into register with control valve outlet line 17 and hydraulic fluid delivered by the pump passes from pressure line 7 to control valve outlet line 17. Almost simultaneously the edge of the right-hand land of spool member 11 approaches the edge of counterbore 36 and separates it from return chamber 38. Hydraulic flow in the by-pass circuit comprising restricted passage 30, rear chamber 32, passage 34 and return chamber 38 is cut off and the pressure in rear chamber 32 builds up to the pump pressure. The pressure forces on the end faces of the valve member being equal, spring 28 urges valve member 24 against its seat. The pressure delivered by the pump builds-up and a corresponding increasing pressure forcibly applies the valve member 24 against its seat as the pump pressure increases, the pressure effective area on the rear end face being larger than that on the front end face of the valve member.

It will be noted that advantages result from the provision of restricted passage 18: the communication between counterbore 36 and return chamber 38 should obviously be closed before pressure line 7 and control valve outlet line 17 be fully connected; if a good operating precision is to be obtained without passage 18, the land length should be exactly determined with respect to the distance between the more distant edges of control valve outlet line 17 and counterbore 36 so as to be only slightly larger. The restricted flow insured by passage 18 permits less closer tolerances in the manufacture of spool member 11, so that as pump pressure is communicated by the passage to the work line to increase slowly the pressure therein while the land still overlaps the opening of control valve outlet line 17. Increase in the overlap at rest is then possible without prejudice to the instantaneity of the control.

As soon as piloted valve 22 has been shut-off by operation of lever 13, the pressure increases in lines 7 and 17. Non-return valve 44 opens when subjected to a pressure differential and admits fluid pressure into motor 42. Movement of the motor piston is transmitted by the follow-up linkage 15 to bring back the spool member 11 into neutral position. The flange 50 of push-rod 46 is maintained against its seat 51 by the pressure in the control valve outlet line 17 and separates the control valve outlet line from return passage 52.

If the spool member is manually brought to "lowering" position (FIGURE 3), the by-pass circuit across piloted valve 22 remains open and the piloted valve maintains substantially unrestricted communication between the pump and the reservoir. The spool member 11 separates pressure line 7 from control valve outlet line 17 and at the same time pivots rocking lever 48 about its articulation on the housing. The rocking lever forces the push rod 46 off its seat 51 and brings it into abutment with the non-return valve 44 for opening the same. Lowering of the implement is progressively slowed when the implement has so displaced as to bring back the spool member close to its neutral position, due to throttling of the flow across the non-return valve 44 during its final approach to closed position. This feature avoids brutal pressure surge, as it occurs, if the non-return valve is slammed shut, due to the kinetic energy gained by the implement for its downward movement.

Figure 3:
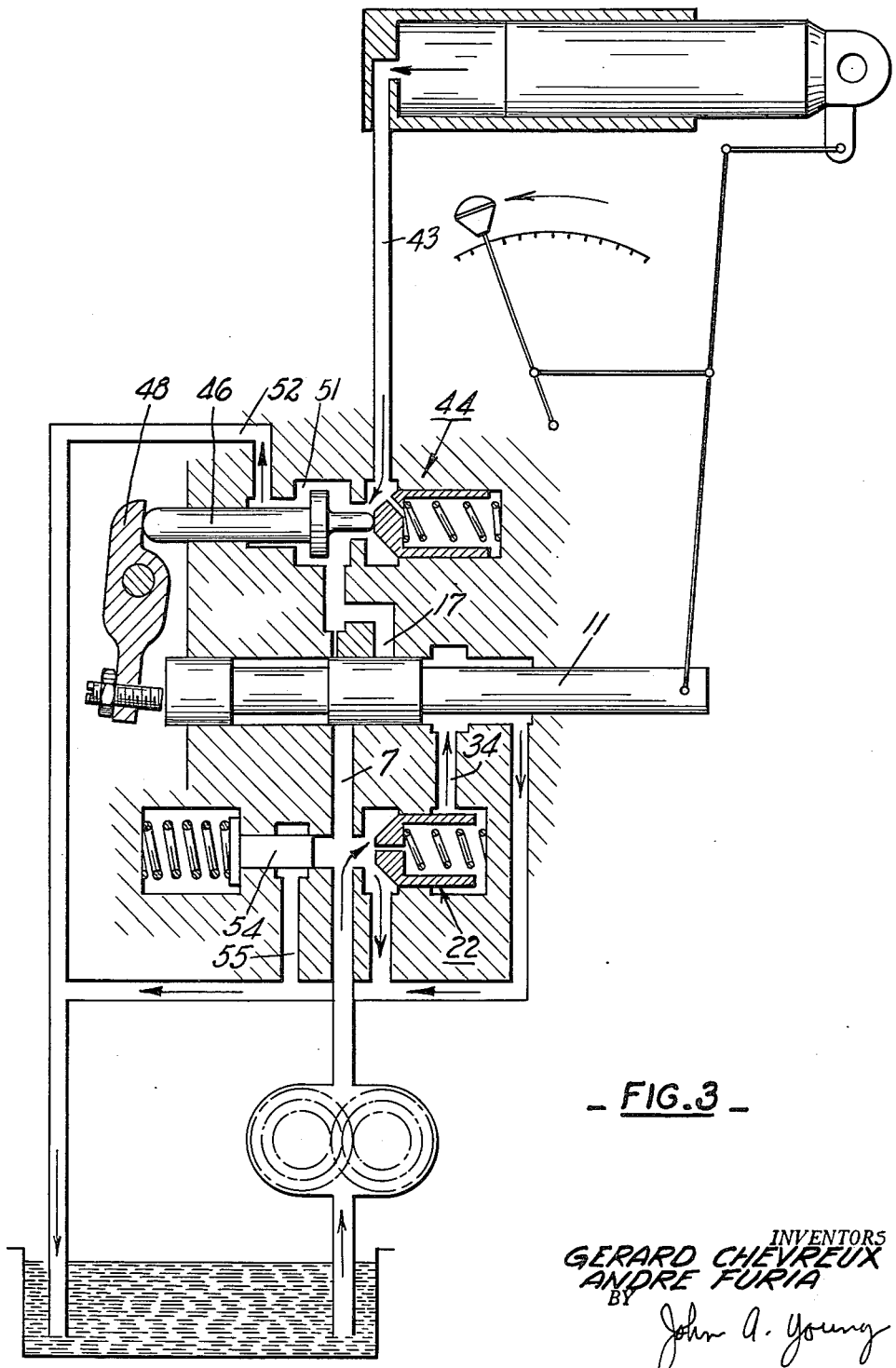
FIGURE 3 is a view similar to FIGURE 2, the control valve being shown in "lowering" position and the system in standby condition.
Figure 4:
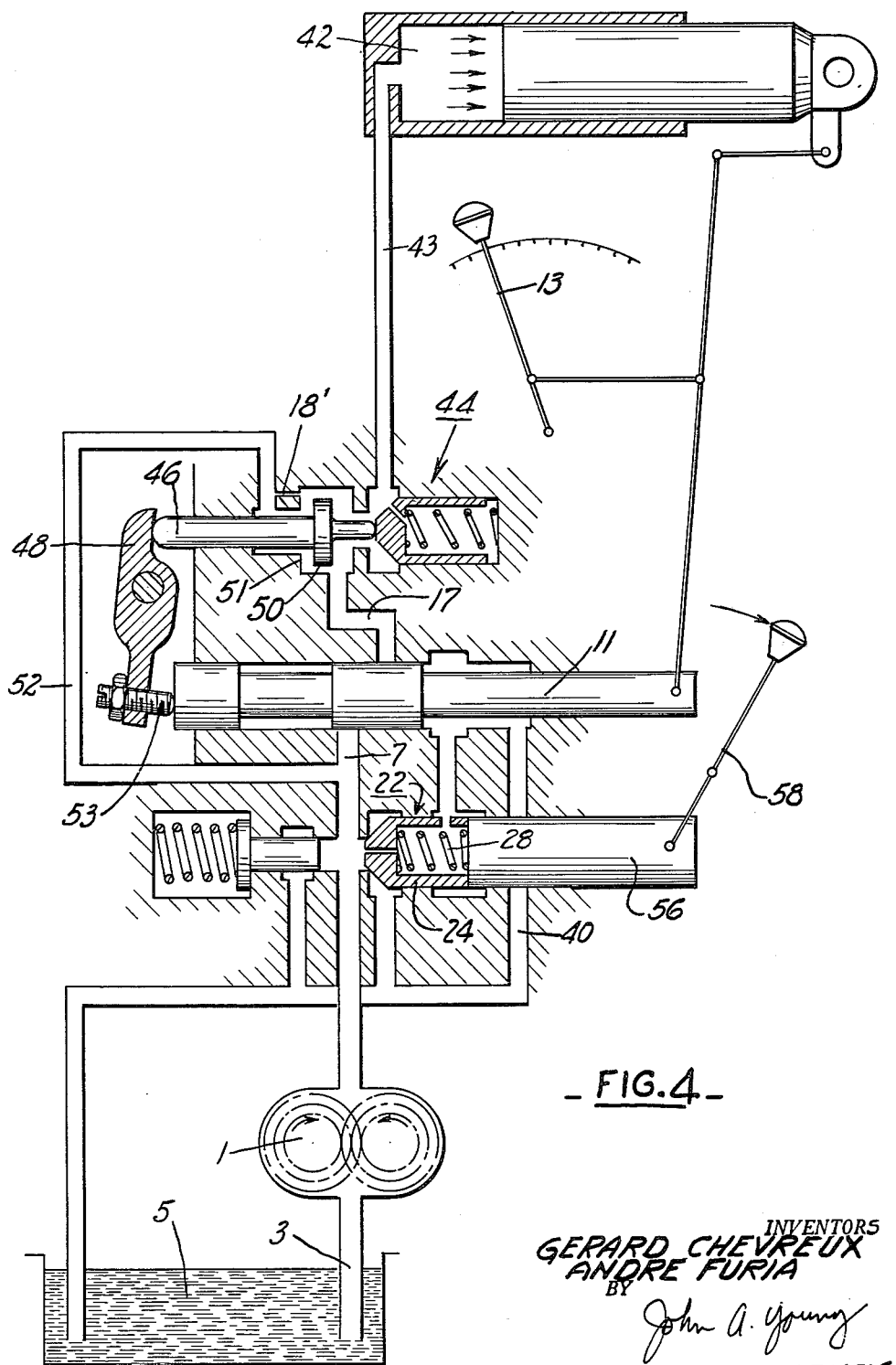
FIGURE 4 shows another embodiment, closely related to that of FIGURES 1-3, provided with an anti-skid device shown in energized condition.

Referring now to FIGURE 4, there is shown a hydraulic system closely related to that of FIGURES 1–3 but embodying an "anti-skid" device. The only supplemental element is a slide member 56 on which spring 28 may abut. Slide member 56 is adapted to engage valve member 24 and to force it toward its seat upon actuation of slide member 56 by a manual control level 58 which is preferably distinct from lever 13. Nevertheless, slide member 56 may equally be actuated by lever 13, for instance by transversal movement of the lever whose longitudinal movement operates the control valve 11.

The passage 52, connected to the return line on FIGURES 1–3, is now connected to pressure line 7. The restricted passage 18 may now be provided in 18' in the seat 51 of push rod 46, as passage 52 is now connected to the pressure line.

When the control valve is in "raising" position, operation of the system is similar to that described with reference to FIGURE 2. Suffice it to say that the push rod 46, whose flange 50 is subjected on both faces to the pump pressure in lines 7 and 17 is forced closed on its seat by the difference in pressure effective areas on its faces.

When the control valve is in "lowering" position, operation of the system is similar to that described with reference to FIGURE 3.

Now, operation of the anti-skid device is as follows: when the control valve is either in "neutral" or "lowering" positions and the driver swings control lever 58 (FIGURE 4), slide member 56 forces valve member 24 toward its seat, thereby throttling hydraulic flow from pressure line 7 toward return line 40. The pressure in line 7 builds up and exerts on valve member 24 a reaction force which is transmitted to control lever 58 and gives the driver a proper feel of the pump pressure. The pump pressure also prevails in line 52, lifts flange 50 off its seat 51, and opens non-return valve 44 for pressurizing motor 42. In order to improve the controllability of the anti-skid a spring may obviously be included between lever 58 and slide member 56, instead of actuating slide member 56 direct.

The anti-skid pressure should preferably be limited to a maximum value so related with the implement weight as not to lift the implement. Pressure limitation is obtained by conventional means, such as an adjustable stop which limits the stroke of lever 58. A convenient maximum pressure is one third of the maximum working pressure.

Figure 5:
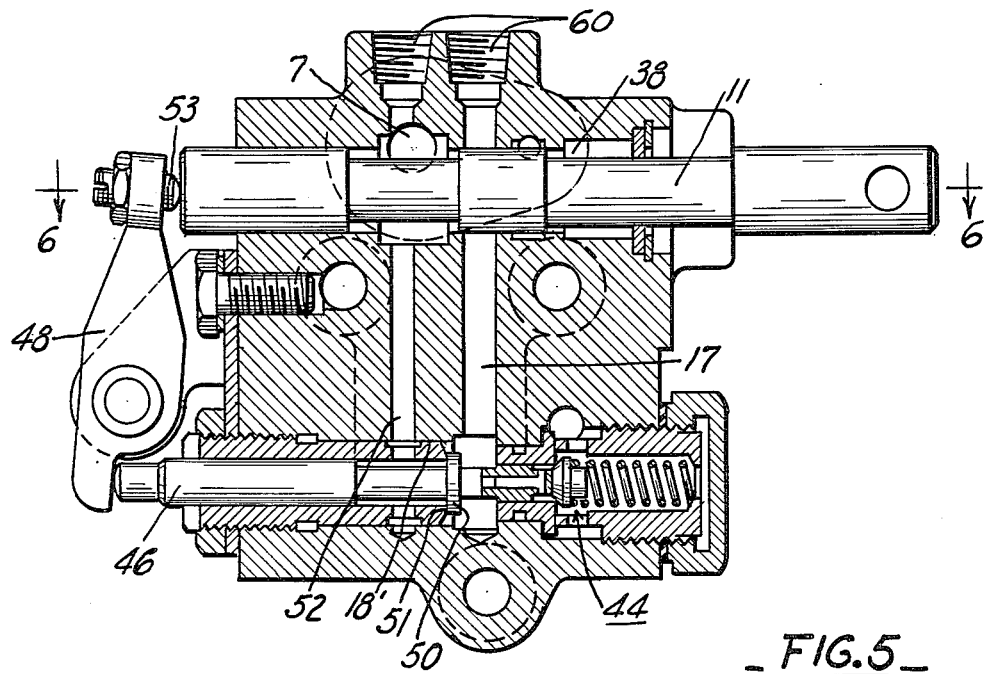
FIGURE 5 is a sectional view of the control valve assembly embodied in the system schematized on FIGURE 4, taken on line 5—5 of FIGURE 7.
Figure 6:
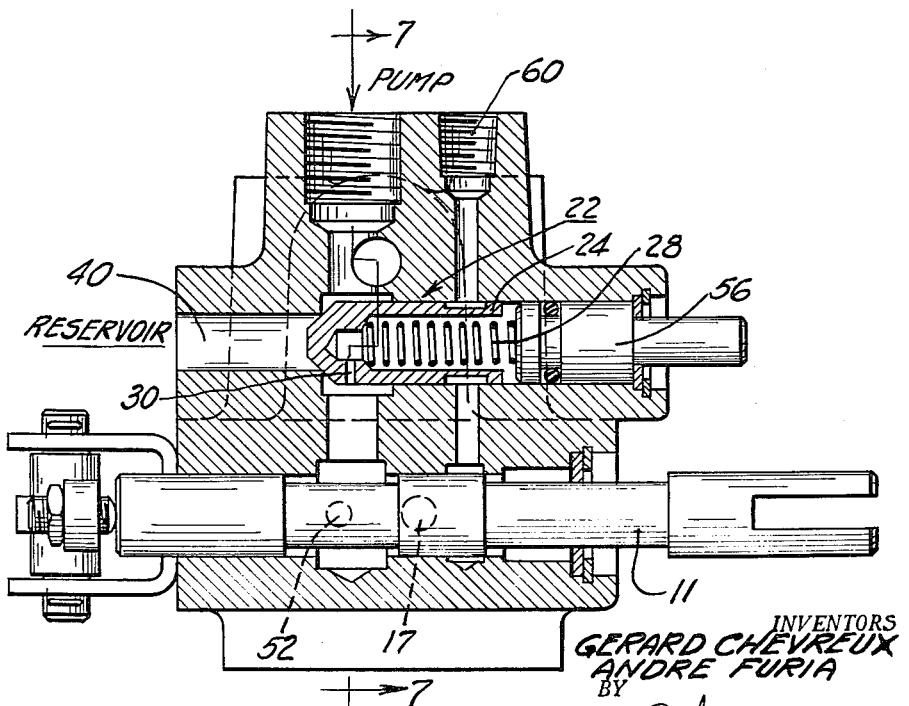
FIGURE 6 is a sectional view of the valve assembly, taken on line 6—6 of FIGURE 5.
Figure 7:
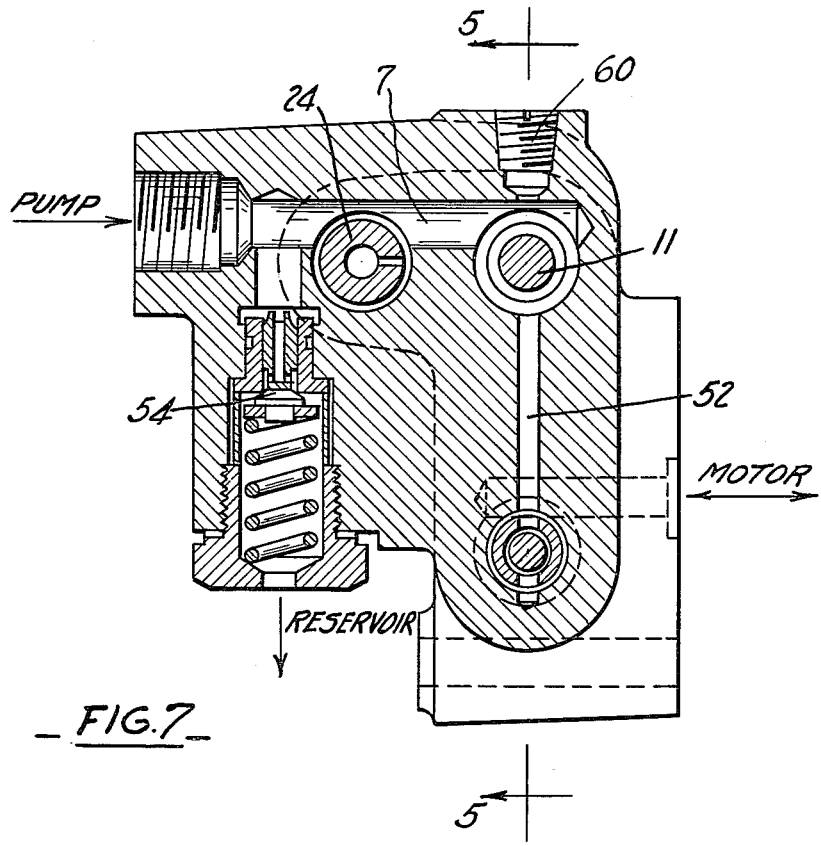
FIGURE 7 is a sectional view of the valve assembly taken on line 7—7 of FIGURE 6.

Referring now to FIGURES 5–7, there is shown a preferred embodiment of the control valve assembly of FIGURE 4. The assembly comprises in the same housing the control valve, the non-return valve 44 and its associated push-rod, the piloted valve 22 and its associated slide member 56, the relief valve 54 and the hydraulic connections. The assembly is designed for simplicity in manufacture and mounting, as is apparent on the drawing. Due to the triangular arrangement of the parallel bores which respectively locate the spool member 11, the non return valve 44 and its associated push rod, the piloted valve 22 and its associated slide member 56, all the internal connections are effected by means of blind drillings in two directions perpendicular to the bore axes, the drillings being eventually closed by threaded closure members 60. The rocking lever 48 is pivoted on a lug attached to the housing, for instance by screws.

There are only slight differences between the embodiment of FIGURES 5–7 and the schematic system of FIGURE 4: The valve assembly 22 is reversed, the return line 40 being located axially. Drilled passage 18' is replaced by an annular clearance between seat 51 and its supporting bore.

Figure 8:
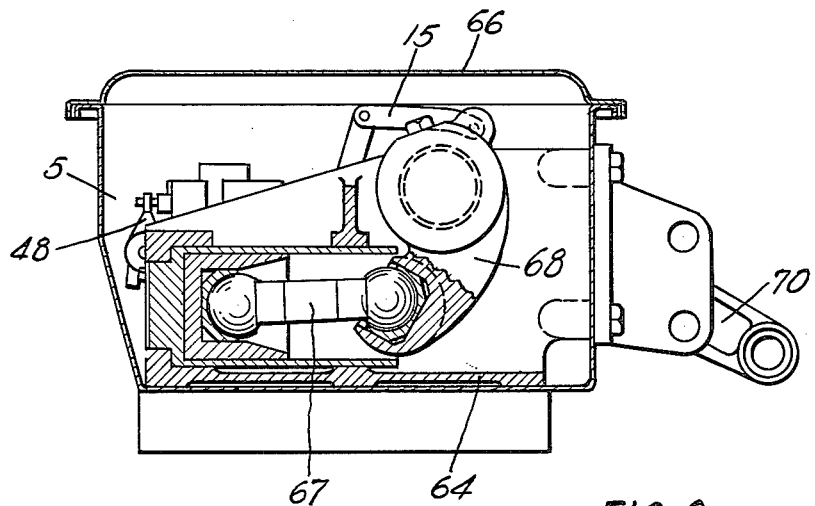
FIGURE 8 is an elevation view, in partial section, of a hydraulic system assembly of the type schematized on FIGURE 4.
Figure 9:
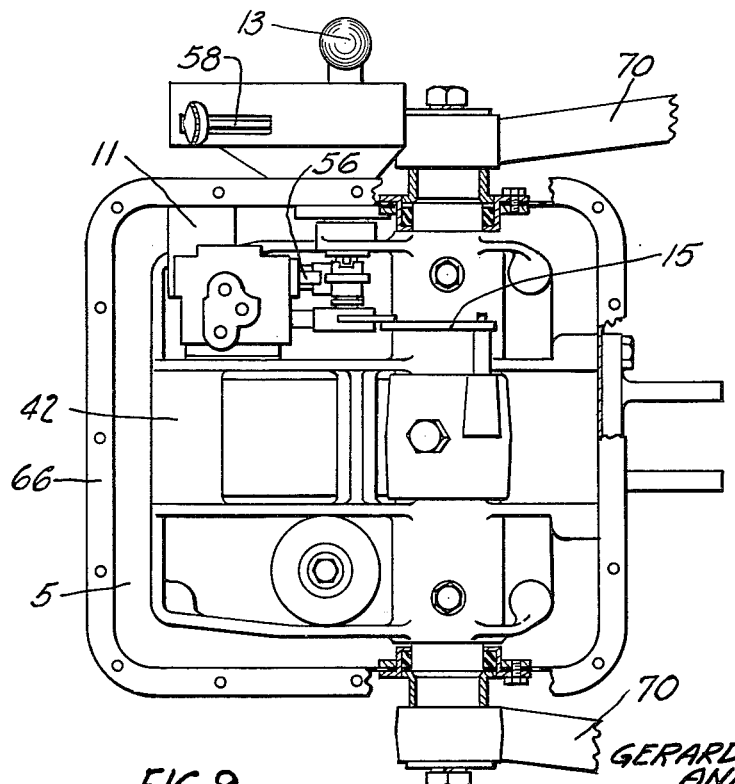
FIGURE 9 shows the assembly of FIGURE 8 seen from the above, cover removed.

Referring now to FIGURES 8 and 9, there is shown a complete hydraulic lift assembly forming an integral mechanism adapted to be fitted on a tractor or removed therefrom as a whole. The assembly is enclosed in a casing, preferably made of iron sheet, and is carried by a cast support plate adapted to take the reaction forces in operation and to transmit them to the tractor frame.

The casing may be designed with large dimension so as to contain an oil volume sufficient to feed auxiliary devices and nevertheless remain of light weight as it does not take any reaction force.

A preferred arrangement of the parts of the lift system is shown on FIGURE 9: the lift cylinder 42 is located axially, in the central portion of the plate. The cylinder piston drives the crank arm 68 of a lift shaft through a connecting rod 67. Two lift arms, which actuate the implement, are secured to the shaft and located one on each side of the casing.

The control system secured to one side of the cylinder (above the cylinder on FIGURE 9) is secured to the support plate by means of screws or bolts located in transverse openings shown on FIGURE 5. The connections between the control valve and the control levers 13 and 58 appear on FIGURE 9. As the valve housing is secured on the cylinder wall, pressure piping between the port referred to as "cylinder" on FIGURE 7 and the cylinder pressure chamber is avoided.

An oil filter may be disposed within the reservoir on the other side of the cylinder for supplying the pump.

The schematic systems of FIGURES 1 to 4 and the embodiment shown on FIGURES 5–9 should not be regarded as limitative, but only as examples given for the purpose of illustration. It will be obvious to those skilled in the art that various changes may be made without departing from the spirit of the invention and it is our intention to include such changes within the scope of the appended claims.

What we claim is:

1. In a pressure control system adapted for raising and lowering a work load comprising: a fluid pressure inlet, control valve outlet passage means, work passage means communicating with said control valve outlet passage means, return passage means communicating with said control valve outlet passage means, control valve means for communicating during raised position and cutting off communication during neutral and lowering position of pressure to said control valve outlet passage means from said pressure inlet, first valve means for communicating said return passage means with said control valve outlet passage means when in open position and cutting off said last named communication when in closed position, second valve means for communicating said work passage means with said control valve outlet passage means when in open position and cutting off said last named communication when in closed position, said first valve means being so constructed and arranged as to be biased into closed position by pressure communicated to said control valve outlet passage means from said pressure inlet by said control valve means, means biasing said second valve means into closed position, said second valve means being so constructed and arranged as to be opened against the force of said biasing means by pressure communicated to said control valve outlet passage means from said pressure inlet by said control valve means, means operatively connected to said control valve means and said first valve means to open said first valve means when said control valve means is in lowering position, and abutment means operably associated with said first valve means for abutting said second valve means and simultaneously opening the same when said first valve means is opened thereby providing passage means from said work passage means past said second and first valve means to said return passage means.

2. The structure as recited in claim 1, wherein said return passage means and said pressure inlet have a common pasasge means to a return, third valve means for communicating said return passage means and pressure inlet with said common passage means when in open position and cutting off said last named communication but allowing communication between said pressure inlet and return passage means when in closed position, means for maintaining said third valve means in open position when said control valve means is in neutral or lowering position, and means for overcoming said maintaining means and moving said third valve means either toward or into closed position whereby pressure return from said pressure outlet passage means may be throttled depending on the position of said third valve means when said control valve means is in lowering position or pressure from said inlet may be communicated to said pressure outlet passage means via said return passage means past said first and second valve means depending on the position of said third valve means when said control valve means is in either neutral or in lowering position.

3. The structure as recited in claim 1 further comprising: a restricted passage maintaining throttled flow between said pressure inlet and said control valve outlet passage means when said control valve means is in neutral position.

4. In a pressure control system adapted for raising and lowering a work load comprising: a fluid pressure inlet, control valve outlet passage means, work passage means communicating with said control valve outlet passage means, return passage means communicating with said control valve outlet passage means, control valve means for communicating during raised position and cutting off communication during neutral and lowering position of pressure to said control valve outlet passage means from said pressure inlet, a valve seat in said control valve outlet passage means at the point of communication between said control valve outlet and return passage means, a slidable first valve member in said control valve outlet passage means and constructed to seat on said valve seat, a valve seat in said work passage means at the point of communication thereof with said control valve outlet passage means, a slidable second valve member biased into engagement with said last named valve seat, said first valve member being so constructed and arranged as to be biased into engagement with its valve seat to close off communication of said return passage means with said control valve outlet passage means by pressure communicated to said control valve outlet passage means from said pressure inlet by said control valve means, said second valve member being so constructed and arranged as to be unseated against the force of said biasing means by pressure communicated to said control valve outlet passage means from said pressure inlet by said control valve means, means operatively connected to said control valve means and said first valve member to open said first valve member when said control valve means is in lowering position, and abutment means on said first valve member for abutting said second valve member and unseating the same when said first valve member is opened, thereby providing passage means from said work passage means past said second and first valve members to said return passage means.

5. The structure as recited in claim 4, wherein said return passage means and said pressure inlet have a common passage means to a return, third valve means for communicating said return passage means and pressure inlet with said common passage means when in open position and cutting off said last named communication but allowing communication between said pressure inlet and return passage means when in closed position, means for maintaining said third valve means in open position when said control valve means is in neutral or lowering position, and means for overcoming said maintaining means and moving said third valve means either toward or into closed position whereby pressure return from said pressure outlet passage means may be depending on the position of said third valve means when said control valve means is in lowering position or pressure from said inlet may be communicated to said pressure outlet passage means via said return passage means past said first and second valve members depending on the position of said third valve means when said control valve means is in either neutral or in lowering position.

6. The structure as recited in claim 4 further comprising: a restricted passage maintaining throttled flow between said control valve outlet passage means and said return passage means when said first valve means is closed.

7. The structure as recited in claim 4, wherein said control valve means is operatively connected to said first valve member by a pivotal lever which has one end operatively connected to said control valve means and the other end operatively connected to said first valve member.

References Cited in the file of this patent

UNITED STATES PATENTS

| | | |
|---|---|---|
| 2,319,551 | Linden et al. | May 18, 1943 |
| 2,403,422 | Worthington | July 2, 1946 |
| 2,477,710 | Worstell | Aug. 2, 1949 |
| 2,544,972 | Worthington et al. | Mar. 13, 1951 |
| 2,689,585 | Presnell | Sept. 21, 1954 |
| 2,847,030 | McRae | Aug. 12, 1958 |